April 7, 1970  G. R. THALMAN  3,504,422

METHOD OF MAKING A DEPTH-TYPE FILTER MEDIA

Filed Jan. 19, 1968

INVENTOR
GEORGE R. THALMAN

BY Nilsson + Robbins
ATTORNEYS

United States Patent Office 3,504,422
Patented Apr. 7, 1970

---

3,504,422
METHOD OF MAKING A DEPTH-TYPE FILTER MEDIA
George R. Thalman, Brea, Calif., assignor to Bell Aerospace Corporation, a corporation of Delaware
Filed Jan. 19, 1968, Ser. No. 703,217
Int. Cl. B23p 17/100
U.S. Cl. 29—419  4 Claims

ABSTRACT OF THE DISCLOSURE

Disclosed is a method of making a depth-type filter media wherein a flat sheet of randomly disposed metallic wires each having a finite length and a predetermined diameter is heated to a temperature such as to cause each of the wires to sinter at their points of contact with each other. Thereafter, the sintered material is compressed to provide over its entire area a consistent permeability thereby to provide a predetermined porosity to the filter media.

BACKGROUND OF THE INVENTION

In the prior art the need for surface type and depth-type filters has long been known. This particular invention is specifically directed to depth-type filter media for use in filter elements of various types which may or may not include as a part thereof surface type filter elements. The utilization of wire in a finely woven form for utilization in filters as filter media therefor has long been known in the prior art. However, such filter media have low dirt-holding capacity and therefore clog rather quickly and necessitate either disposal thereof or cleaning thereof. As a result of either the cleaning or the disposal necessities, it can be seen that prior art wire filters are relatively expensive to utilize.

Also in the prior art, in attempting to utilize metal to form filter media it has been the practice to utilize either a woven wire mesh material or very fine dust-like particles of the desired metal compound, and when using the dust-like particles it has been the practice to sinter them together to provide the filter media. Such sintered dust-like particle filter media, although working quite well for the purposes intended, are relatively weak mechanically and normally cannot easily be formed into various geometric shapes, such as corrugations to fit within the usually desired filters as elements therefor. Also as a result of the weakness exhibited by such filter media, they are not usually suitable for incorporation into filter elements subjected to quite high fluid pressures.

Furthermore, the traditional process of manufacturing such dust-like particle sintered metal filter media is to provide rather expensive molds which are filled with the particles and then advanced through the sintering furnace. Such molds normally are quite expensive and must be replaced rather often as a result of deterioration from repeated heatings in the sintering furnace. Thus the prior art filter media constructed in such a manner necessarily was rather expensive.

SUMMARY OF THE INVENTION

Accordingly, it is an object of the present invention to provide a depth-type filter media and the method of manufacturing the same which is more reliable than prior art filter media manufactured of metal, which is less expensive than prior art filter media formed of metal, which has a higher level of performance than prior art filter media formed of metal, which has an increased efficiency, which will offer reduction in size and weight of a filter element of the same effectiveness as the prior art filter element or a startlingly increased effectiveness for a filter element of the same size and weight as a prior art filter element, which has a much greater contaminant-holding capacity than prior art filters of similar size and shape, which has a larger number of pores per square inch than heretofore deemed possible by utilization of metallic filter media, which has no migration of the filter media irrespective of the application of high pressures and forces thereto, and which is readily easily formed into any desired geometric configuration without damage.

A depth-type filter media constructed in accordance with the present invention includes a layer of metallic wire fibers having finite length which are randomly disposed throughout the layer and which are sintered together at points of mutual contact. The layer of metallic wire fibers has a consistent permeability throughout.

The method of making the filter media in accordance with the present invention includes the steps of providing a layer of randomly disposed metallic wire fibers, heating said layer of metallic fibers to a temperature sufficient to sinter the same at mutual points of contact, cooling the thusly sintered layer of metallic fibers and compressing said layer over its entire area to a consistent porosity.

BRIEF DESCRIPTION OF THE DRAWING

Additional objects and advantages of the present invention, both as to its organization and method of operation will become apparent from a consideration of the following description taken in conjunction with the accompanying drawing which.

DESCRIPTION OF THE PREFERRED EMBODIMENT

Figure 1:
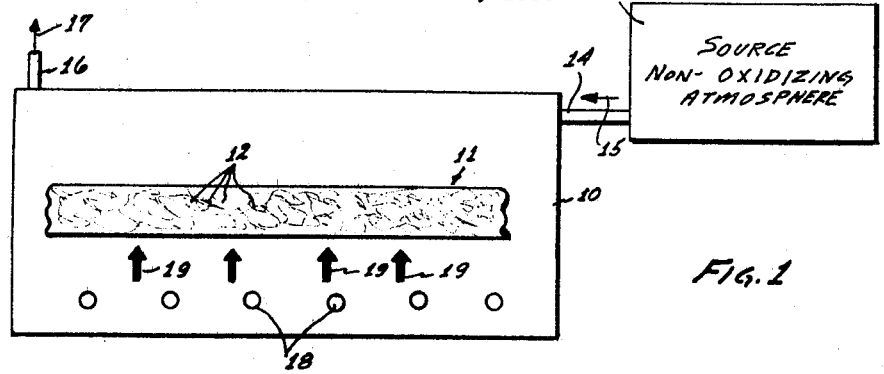
FIGURES 1 through 4 schematically illustrate steps taken in the process of manufacturing a filter media constructed in accordance with the present invention.

Referring now to the drawing and more particularly to FIGURE 1 thereof, there is schematically illustrated a furnace 10 within which there is positioned a layer 11 of felted wire cloth material. The felted wire cloth material in accordance with the present invention should be understood to mean a layer of material having a plurality of wire fibers 12 randomly disposed throughout and each having a finite but random length. The wire fibers are held both by surface roughness and intertwining thereof.

The source 13 of non-oxidizing atmosphere is connected by means of a conduit 14 so that it will enter the furnace 10 as indicated by the arrow 15. An exhaust port 16 is also connected to the furnace 10 to permit the non-oxidizing atmosphere to exit from the furnace as indicated by the arrow 17. A source of heat such as electric coils 18 are positioned so as to generate heat as indicated by the arrows 19 in such a manner that it will contact the felted wire cloth material 11. The contact of the heat 19 raises the temperature of the individual fibers 12 of metallic material to a temperature such that the individual fibers will become sintered at their points of mutual contact; that is, at these points where one of the wires touches another wire, the touching wires melt together. In order for such to be accomplished, the wires are heated to a temperature above the annealing point thereof but less than the melting point of the wire fibers. Various types of wire fibers may be utilized in accordance with the present invention. The particular sintering temperature will obviously vary depending upon the wire fiber utilized. For example, if the wire fiber is stainless steel, then the cloth 11 should be heated to a temperature of approximately 2000° F. and maintained at that temperature for a period of approximately 3 minutes. By so doing, a complete sintering of each of the wire fibers at its point of mutual contact with any other wire fiber is assured. Other wire fibers may be utilized; for example, such as steel, molybdenum, titanium, various metal alloys such as bronze, nickel and the like. In each instance, the particular temperature for sintering will depend upon the metal utilized for the wire fibers. After the wire fibers have been sintered, the source of heat 18 is removed and the wire cloth 11 is allowed to cool in a non-oxidizing atmosphere to approximately room temperature. The non-oxidizing atmosphere may be a reducing atmosphere of dry hydrogen, for example.

Figure 2:
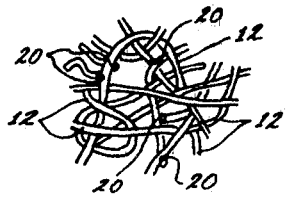

The random orientation and length of the wire fibers is indicated by the schematic diagram of FIGURE 2 which clearly shows the lack of orientation of any of the wire fibers 12. Furthermore, the sintering, that is melting together of the wires at the points of mutual contact therebetween, is illustrated at 20 for example.

The individual wire fibers may have any diameter desired for a particular application. The selection of the diameter of each of the individual fibers will determine the ultimate number of pores per square inch of the material when incorporated into the filter and also will determine the absolute diameter of particle removal from the fluid stream which is being filtered. It has, therefore, been determined that the maximum diameter size usable to provide a filter in accordance with the present invention is about 12 microns. If wire fiber size beyond that diameter is utilized, it has been found that the life of the filter media is substantially reduced from that which is feasible for utilization of the media as a typical filter element.

Figure 3:
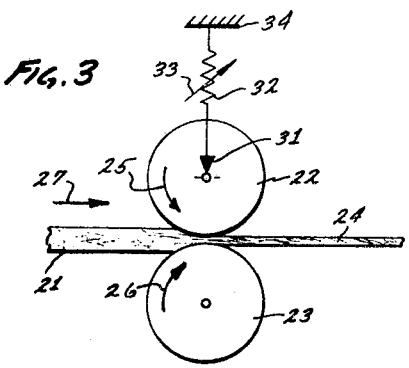

To control the functioning of the wire cloth after it has been sintered so as to cause it to operate as a true filter media, it has been found that the sintered felted wire cloth must be compressed over its entire area to provide a uniform permeability, thereby to provide a predetermined porosity for the material. Therefore, the sintered felted wire cloth as illustrated at 21, FIGURE 3, is passed through a compressing apparatus such as between a pair of rollers 22 and 23 so as to compress the material as illustrated at 24. The direction of travel of the rollers 22 and 23 is as illustrated by the arrows 25 and 26 respectively, thus causing the material 21–24 to travel between the rollers in the direction as illustrated by the arrow 27. Before being compressed, the felted wire cloth 11 may vary in thickness over its entire area. It has been discovered that if the distance between the rollers 22 and 23 is set to be a fixed amount, the permeability of the material after compression also will vary. In those areas wherein there is a variation of thickness, the variation in density of the material at such points from the norm or average will be either greater or lesser, depending upon the thickness of the material at such points. Therefore, it has been found that by fixing the position of one of the rollers, for example the roller 23 in FIGURE 3, and by applying a resilient but controlled load to the other roller, as illustrated by the combination of the arrow 31 and the spring 32 (the spring 32 is fixed in place as illustrated by the ground symbol 34), a constant permeability of the material 24 as it passes through the rollers can be provided. That is, as the thickness of the material 21 varies over its area, the roller 22 floats (moves up or down depending on the instantaneous material thickness) so as to maintain a consistent permeability through the cross-section of the material after it is compressed as illustrated at 24.

Figure 4:
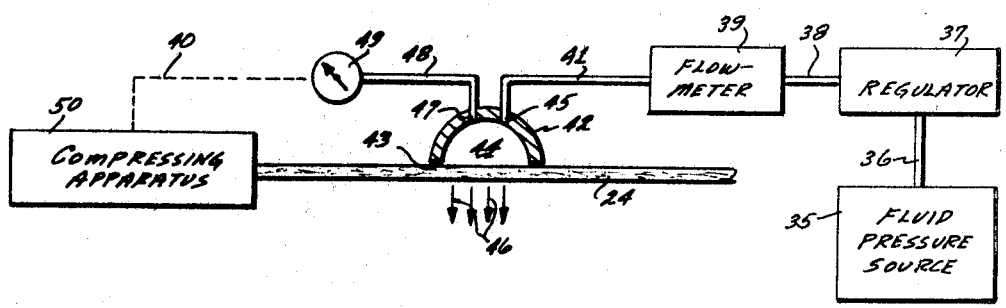

For purposes of maintaining the desired permeability and ascertaining that such has been obtained, the permeability of the material may be tested as illustrated in FIGURE 4. As is therein shown, a fluid pressure source 35 is connected by a conduit 36 to a pressure regulator 37. The output of the pressure regulator 37 is connected by the conduit 38 to the flowmeter 39, the output of which is connected by conduit 41 to a flow-directing device 42. The flow-directing device 42 has an open end 43 which is continuous in nature and provides an enclosed cavity 44 when the end 43 is placed against a desired object, such for example as the felted, sintered and compressed wire cloth 24.

When it is desired to check the permeability of the filter media 24 formed in accordance with the present invention, the surface or edge 43 of the flow-directing cup 42 is placed against the surface of the filter media 24 and regulated fluid under pressure such as compressed air or gas is directed in a measured amount through the flowmeter 39 and the conduit 41 to a port 45 into the volume 44 in such a manner that the air flows through the filter media 24 as indicated by the arrows 46. Since the filter media 24 obviously provides some restriction to the flow of the fluid under pressure therethrough, a pressure drop thereacross occurs. This pressure drop causes the pressure within the cavity 44 to be greater than atmospheric pressure. This pressure buildup within the cavity 44 is conveyed through the port 47 and the conduit 48 to a meter 49 which reads the same. Thus the actual permeability of the filter material is ascertained through this measurement step. In the event there are any substantial variations from the desired consistency, such will be determined and the material may be again passed through the rollers 22 and 23 after adjustment of the spring means 32 (if necessary) until the desired permeability is obtained. In addition, the output of the meter 49 may be coupled through a connection 40 to the compressing apparatus 50 to vary the amount of compression of the material proportional to the desired permeability.

Figure 5:
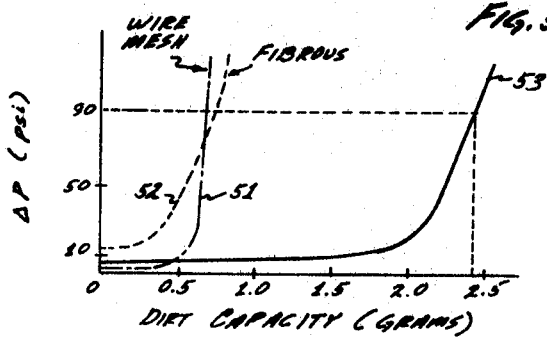
FIGURE 5 is a graph illustrating the operating capacity of the filter media constructed in accordance with the present invention as compared to established requirements in the industry.

A filter media in accordance with the present invention, when incorporated as a portion of the filter element within the typical filter, for example, which is utilized in a hydraulic system, has a capacity which far exceeds that of woven wire mesh, sintered particles, or fibrous filters of the type presently in existence. Such capacity is illustrated for a comparative basis in FIGURE 5 which is a graph illustrating a capacity by way of grams of dirt on the abscissa and the pressure drop across the filter in pounds per square inch as illustrated on the ordinate. As is found in FIGURE 5, the curves 51 and 52 illustrate respectively a sintered particle or woven wire mesh and a fibrous disposable type filter media which meet the dirt capacity requirement at 90 pounds per square inch pressure drop as established by military specification MIL–F–8815. As is therein shown, the wire mesh type filter element (curve 51) would, at 90 p.s.i. pressure drop thereacross, have approximately 0.7 gram dirt capacity; a fibrous filter (curve 52) would have approximately 0.75 gram dirt capacity at 90 p.s.i. pressure drop. On the other hand, the filter media construction in accordance with the present invention (curve 53) of a sintered compressed felted wire cloth having comparable area and pore size to that of either the wire mesh or fibrous filters of the prior art would have a capacity of approximately 2.4 grams dirt at a pressure drop of 90 p.s.i. thereacross. As is clearly shown by FIGURE 5, the dirt capacity of a filter element fabricated using the filter media constructed in accordance with the present invention is in excess of four times that of a typical prior art device constructed either of wire mesh or fibrous materials.

There has thus been disclosed a filter media of the depth-type which is simple to manufacture, inexpensive, yet provides a higher degree of efficiency and contaminant-holding capacity than prior art devices. Also disclosed is the method of manufacturing such a filter media.

What is claimed is:

1. The method of making a depth-type filter media comprising the steps of:
    (1) providing a felted wire cloth material;
    (2) heating said material in a non-oxidizing ambient to a temperature below its melting point but above its annealing point for a time sufficient to permit sintering thereof;
    (3) cooling said material in a non-oxidizing ambient; and (4) placing said sintered material between a pair of members having a controlled resilient load applied thereto, one of said members being free to move to receive varying thicknesses of said material, whereby said material is compressed over its entire area to a consistent permeability.

2. The method of claim 1 which further includes the step of passing a fluid under pressure through said compressed material thereby to determine the permeability of said media.

3. The method of claim 2 which further includes the step of additionally compressing said material to provide a desired consistent permeability.

4. The method of claim 1 which further includes the steps of passing fluid under pressure through said compressed material, determining the pressure drop across said compressed material, and varying the load applied by said members to said material thereby to obtain a predetermined permeability.

References Cited

UNITED STATES PATENTS

| | | | |
|---|---|---|---|
| 2,520,124 | 8/1950 | Chaney et al. | 55—527 |
| 3,098,723 | 7/1963 | Micks. | |
| 3,310,387 | 3/1967 | Sump et al. | 29—419 X |
| 3,443,301 | 5/1969 | Basche | 29—419 |

FOREIGN PATENTS

| | | |
|---|---|---|
| 1,318,752 | 1/1963 | France. |
| 1,341,685 | 9/1963 | France. |

JOHN F. CAMPBELL, Primary Examiner

D. C. REILEY, Assistant Examiner

U.S. Cl. X.R.

29—163.5; 55—527; 100—47; 210—496; 264—125